United States Patent
Yoon et al.

(10) Patent No.: US 7,535,869 B2
(45) Date of Patent: *May 19, 2009

(54) APPARATUS AND METHOD FOR DYNAMICALLY ASSIGNING RESOURCES IN AN OFDM COMMUNICATION SYSTEM

(75) Inventors: Seok-Hyun Yoon, Seoul (KR); Chang-Ho Suh, Seoul (KR); Young-Kwon Cho, Suwon-si (KR); Chan-Byoung Chae, Seoul (KR); Jung-Min Ro, Seoul (KR)

(73) Assignee: Samsung Electronics Co., Ltd (KR)

( * ) Notice: Subject to any disclaimer, the term of this patent is extended or adjusted under 35 U.S.C. 154(b) by 626 days.

This patent is subject to a terminal disclaimer.

(21) Appl. No.: 10/941,744

(22) Filed: Sep. 15, 2004

(65) Prior Publication Data

US 2005/0068884 A1   Mar. 31, 2005

(30) Foreign Application Priority Data

Sep. 15, 2003   (KR) ...................... 10-2003-0063849

(51) Int. Cl.
*H04Q 7/20* (2006.01)
*H04Q 7/38* (2006.01)

(52) U.S. Cl. ...................... 370/329; 370/328; 370/208; 370/340; 455/450; 455/451; 455/452.2; 455/509; 455/511; 375/220

(58) Field of Classification Search ................. 370/329, 370/335, 328, 208, 340, 341, 203, 430; 375/346; 455/450, 452.1, 452.2, 509, 511, 451, 515, 455/69, 68, 422.1, 403, 445, 500, 571, 426.1, 455/126.3, 414.1, 414.2, 414.3

See application file for complete search history.

(56) References Cited

U.S. PATENT DOCUMENTS

| | | | |
|---|---|---|---|
| 6,377,636 B1 * | 4/2002 | Paulraj et al. ................ | 375/346 |
| 7,072,315 B1 * | 7/2006 | Liu et al. ..................... | 370/329 |
| 7,209,460 B2 * | 4/2007 | Fitzek et al. ................ | 370/329 |
| 2004/0120289 A1 * | 6/2004 | Hamalainen et al. ........ | 370/335 |

* cited by examiner

*Primary Examiner*—Charles N Appiah
*Assistant Examiner*—Joy K Contee
(74) *Attorney, Agent, or Firm*—The Farrell Law Firm, PC

(57) ABSTRACT

A mobile communication system and method utilizing Orthogonal Frequency Division Multiplexing (OFDM) receives channel quality information (CQIs) for subcarriers through which reference signals are transmitted and subcarriers through which data signals are transmitted, in subbands, each including a predetermined number of subcarriers among a plurality of the subcarriers. The CQIs are received from respective receivers. Resources are dynamically assigned to the respective receivers according to the feedback CQIs, thereby enabling dynamic resource assignment with minimized signaling overhead.

16 Claims, 6 Drawing Sheets

APPARATUS AND METHOD FOR DYNAMICALLY ASSIGNING RESOURCES IN AN OFDM COMMUNICATION SYSTEM

PRIORITY

This application claims priority under 35 U.S.C. § 119 to an application entitled "Apparatus and Method for Dynamically Assigning Resources in an OFDM Communication System" filed in the Korean Intellectual Property Office on Sep. 15, 2003 and assigned Serial No. 2003-63849, the contents of which are incorporated herein by reference.

BACKGROUND OF THE INVENTION

1. Field of the Invention

The present invention relates generally to a communication system utilizing an Orthogonal Frequency Division Multiplexing ('OFDM') scheme, and in particular, to an apparatus and method for dynamically assigning resources using channel quality information that is separately fed back on sub-bands.

2. Description of the Related Art

Since the late 1990's, South Korea has partially deployed an IMT-2000 (International Mobile Telecommunication-2000) system, a $3^{rd}$ generation (3G) mobile communication system, aimed at advancing wireless multimedia service, global roaming, and high-speed data service. The 3G mobile communication system was developed especially to transmit data at high rate in compliance with the increase in amount of service data. Accordingly, the 3G mobile communication system has evolved into a packet service communication system that transmits burst packet data to a plurality of mobile stations and is designed for transmitting mass data.

Consequently, the packet service communication system is being developed for a high-speed packet service. For example, High Speed Downlink Packet Access (HSDPA), which is under standardization in $3^{rd}$ Generation Partnership Project (3GPP), a standardization organization for the asynchronous 3G mobile communication system, has recently introduced Adaptive Modulation and Coding (AMC) scheme, Hybrid Automatic Retransmission Request (HARQ) scheme, and Fast Cell Select (FCS) scheme in order to support a high-speed packet data service.

The AMC scheme refers to a data transmission scheme for adaptively determining different channel modulation schemes and coding schemes according to a channel condition between a cell (or a base station (BS)) and a mobile station (MS), thereby improving efficiency of the entire cell. The AMC scheme has a plurality of modulation schemes and a plurality of coding schemes, and modulates and codes a channel signal using a preferred combination of the modulation schemes and the coding schemes. Commonly, each combination of the modulation schemes and the coding schemes is called a Modulation and Coding Scheme (MCS), and a plurality of MCSs with a level 1 to a level N can be defined according to the number of MCSs. That is, the AMC scheme adaptively determines a level of the MCS according to a channel condition between the mobile station and the base station to which the mobile station is currently wirelessly connected, thereby improving efficiency of the entire base station system. The AMC scheme, HARQ scheme, and FCS scheme can be used not only in the HSDPA scheme but also in all other scheme s for high-speed data transmission.

Currently, the 3G mobile communication system is developing into a $4^{th}$ generation (4G) mobile communication system. The 4G mobile communication system is under standardization, aimed at efficient interworking and an integrated service between a wired communicant network and a wireless communication network, beyond a simple wireless communication service provided in the earlier-generation mobile communication system. Therefore, many studies and experiments are being conducted on scheme s for transmitting a large volume of data (e.g., approaching the capacity of a wired communication network) in a wireless communication network. Further, in the 4G mobile communication system, active research is being performed on a Dynamic Channel Allocation (DCA) scheme for dynamically assigning channels based on an individual channel condition of each mobile station in order to transmit mass data.

Accordingly, in the 4G mobile communication system, active studies are being made of an OFDM scheme as useful scheme for high-speed data transmission in wired/wireless channels. The OFDM scheme, a scheme for transmitting data using multiple carriers, is a kind of Multi-Carrier Modulation (MCM) for parallel-converting a serial input symbol stream and modulating the parallel-converted symbols with a plurality of orthogonal subcarriers before transmission.

The OFDM scheme, although it is similar to a conventional Frequency Division Multiplexing (FDM) scheme, is characterized in that it can secure optimal transmission efficiency during high-speed data transmission by maintaining orthogonality between subcarriers. In addition, the OFDM scheme is characterized in that it has high frequency efficiency and is robust against multipath fading, thereby securing optimal transmission efficiency during high-speed data transmission. Further, because the OFDM scheme uses overlapped frequency spectrums, it has high frequency efficiency, is robust against frequency selective fading and multipath fading, reduces Inter-Symbol Interference (ISI) using a guard interval, enables design of an equalizer with a simple hardware structure, and is robust against impulse noises. For such advantages, the OFDM scheme shows a tendency to be actively applied to communication systems.

FIG. 1 is a block diagram schematically illustrating a structure of a conventional communication system utilizing the OFDM scheme (OFDM communication system). Referring to FIG. 1, the OFDM communication system includes a transmitter, for example, a base station transmitter 100, and a receiver, for example, a mobile station receiver 150.

The base station transmitter 100 includes a Cyclic Redundancy Check (CRC) inserter 111, an encoder 113, a resource assignment controller 115, a symbol mapper 117, a channel multiplexer (MUX) 119, a serial-to-parallel (S/P) converter 121, a pilot symbol inserter 123, an inverse fast Fourier transform (IFFT) unit 125, a parallel-to-serial (P/S) converter 127, a guard interval inserter 129, a digital-to-analog (D/A) converter 131, and a radio frequency (RF) processor 133.

When there are user data bits and control data bits to transmit, the user data bits and the control data bits are input to the CRC inserter 111. Herein, the user data bits and the control data bits will be referred to as information data bits, and the control data includes resource assignment information applied in the resource assignment controller 115, i.e., AMCS (Adaptive Modulation and Coding Scheme) information (or MCS level information), channel multiplexing information, and transmission power information. The CRC inserter 111 inserts CRC bits in the information data bits, and outputs CRC-inserted information data bits to the encoder 113. The encoder 113 encodes the signal output from the CRC inserter 111 using a predetermined coding scheme received from the resource assignment controller 115, and outputs the encoded signal to the symbol mapper 117. Turbo coding scheme or convolutional coding scheme having a predetermined coding rate can be used as the coding scheme. The resource assignment controller 115 can control either or both of the coding rate and the coding scheme according to conditions of the OFDM communication system. The resource assignment controller 115 determines channel conditions between the base station and a mobile station based on Channel Quality Information (CQI) fed back from a mobile station transmitter (not illustrated in FIG. 1). For example, the CQI can be a Signal-to-Noise Ratio (SNR).

The symbol mapper 117 modulates the coded bits output from the encoder 113 into modulation symbols using a corresponding modulation scheme under the control of the resource assignment controller 115, and outputs the modulation symbols to the channel multiplexer 119. For example, quadrature phase shift keying (QPSK) scheme or 16-ary quadrature amplitude modulation (16QAM) scheme can be used as the modulation scheme. The channel multiplexer 119 channel-multiplexes the modulation symbols output from the symbol mapper 117 under the control of the resource assignment controller 115, and outputs the channel-multiplexed symbols to the serial-to-parallel converter 121. The resource assignment controller 115 controls the channel multiplexer 119 such that among the subchannels available in the OFDM communication system, an optimal subchannel is assigned to a corresponding mobile station according to channel conditions between the base station and the mobile station. That is, the resource assignment controller 115 controls the channel multiplexer 119 such that among the subchannels available in the OFDM communication system, a subchannel capable of maximizing the entire frequency efficiency, when it is assigned to a corresponding mobile station, should be assigned to the corresponding mobile station. Herein, the subchannel refers to a channel including at least one subcarrier. In the following description, it will be assumed that each subchannel includes one subcarrier, for the convenience of explanation. Further, in the following description, the subchannel and the channel have the same meaning.

The channel multiplexer 119 dynamically multiplexes channels on a dynamic channel assignment basis according to channel conditions between the base station and the mobile station, thereby improving system performance.

If a channel condition between the base station and the mobile station is relatively excellent, the resource assignment controller 115 changes a current modulation scheme to a new modulation scheme having a higher order than an order of the current modulation scheme, and changes a current coding scheme to a new coding scheme having a higher coding rate than a coding rate of the current coding scheme. No matter how excellent the channel condition is, if the current modulation scheme has the highest possible order, the resource assignment controller 115 maintains the current modulation scheme, and if the current coding rate is the highest possible coding rate, the resource assignment controller 115 maintains the current coding rate.

However, if a channel condition between the base station and the mobile station is relatively poor, the resource assignment controller 115 changes a current modulation scheme to a new modulation scheme having a lower order than an order of the current modulation scheme, and changes a current coding scheme to a new coding scheme having a lower coding rate than a coding rate of the current coding scheme. No matter how poor the channel condition is, if the current modulation scheme has the lowest possible order, the resource assignment controller 115 maintains the current modulation scheme, and if the current coding rate is the lowest possible coding rate, the resource assignment controller 115 maintains the current coding rate.

In addition, the resource assignment controller 115 controls the channel multiplexer 119 such that among the channels available in the base station, a channel capable of providing the best channel condition, when it is assigned to a corresponding mobile station, should be assigned to the corresponding mobile station, thereby improving the entire system performance. Although not illustrated in FIG. 1, the resource assignment controller 115 also controls transmission power to be applied to a channel assigned to the corresponding mobile station by the channel multiplexer 119. An operation of assigning a channel, and determining an MCS level and transmission power by the resource assignment controller 115 will be described in more detail herein below.

The serial-to-parallel converter 121 parallel-converts the channel-multiplexed serial modulation symbols output from the channel multiplexer 119, and outputs the parallel-converted modulation symbols to the pilot symbol inserter 123. The pilot symbol inserter 123 inserts pilot symbols into the parallel-converted modulation symbols output from the serial-to-parallel converter 121, and outputs the pilot-inserted modulation symbols to the IFFT unit 125.

The IFFT unit 125 performs N-point IFFT on the pilot-inserted modulation symbols output from the pilot symbol inserter 123, and outputs the IFFT-processed modulation symbols to the parallel-to-serial converter 127. The parallel-to-serial converter 127 serial-converts the IFFT-processed parallel modulation symbols output from the IFFT unit 125, and outputs the serial-converted modulation symbols to the guard interval inserter 129. The guard interval inserter 129 inserts a guard interval signal into the serial-converted modulation symbols output from the parallel-to-serial converter 127, and outputs the guard interval-inserted modulation symbols to the digital-to-analog converter 131. The guard interval is inserted to remove interference between a previous OFDM symbol transmitted at a previous OFDM symbol time and a current OFDM symbol to be transmitted at a current OFDM symbol time in the OFDM communication system. The guard interval is inserted in a cyclic prefix scheme or a cyclic prefix scheme. In the cyclic prefix scheme, a predetermined number of last samples of an OFDM symbol in a time domain are copied and inserted into a valid OFDM symbol, and in the cyclic postfix scheme, a predetermined number of first samples of an OFDM symbol in a time domain are copied and inserted into a valid OFDM symbol.

The digital-to-analog converter 131 analog-converts the signal output from the guard interval inserter 129, and outputs the analog-converted signal to the RF processor 133. The RF processor 133, including a filter and a front-end unit, RF-processes the signal output from the digital-to-analog converter 131, and transmits the RF-processed signal via a transmission antenna.

The mobile station receiver 150 includes an RF processor 151, an analog-to-digital (A/D) converter 153, a guard interval remover 155, a serial-to-parallel (S/P) converter 157, a fast Fourier transform (FFT) unit 159, an equalizer 161, a pilot symbol extractor 163, a channel estimator 165, a parallel-to-serial (P/S) converter 167, a channel demultiplexer (DEMUX) 169, a resource assignment controller 171, a symbol demapper 173, a decoder 175, and a CRC remover 177.

The signals transmitted by the base station transmitter 100 are received via a reception antenna of the mobile station receiver 150. The received signals experience a multipath channel and have a noise component. The signals received via the reception antenna are input to the RF processor 151. The RF processor 151 down-converts the signals received via the reception antenna into an intermediate frequency (IF) signal, and outputs the IF signal to the analog-to-digital converter 153. The analog-to-digital converter 153 digital-converts an analog signal output from the RF processor 151, and outputs the digital-converted signal to the guard interval remover 155. The guard interval remover 155 removes a guard interval signal from the digital-converted signal output from the analog-to-digital converter 153, and outputs the guard interval-removed signal to the serial-to-parallel converter 157. The serial-to-parallel converter 157 parallel-converts the serial signal output from the guard interval remover 155, and outputs the parallel-converted signal to the FFT unit 159.

The FFT unit 159 performs N-point FFT on the signal output from the serial-to-parallel converter 157, and outputs the FFT-processed signal to the equalizer 161 and the pilot symbol extractor 163. The equalizer 161 channel-equalizes the signal output from the FFT unit 159, and outputs the channel-equalized signal to the parallel-to-serial converter 167. The parallel-to-serial converter 167 serial-converts the parallel signal output from the equalizer 161, and outputs the serial-converted signal to the channel demultiplexer 169. The channel demultiplexer 169 channel-demultiplexes the serial-converted signal output from the parallel-to-serial converter 167 under the control of the resource assignment controller 171, and outputs the channel-demultiplexed signal to the symbol demapper 173. The resource assignment controller 171 controls a channel demultiplexing operation of the channel demultiplexer 169 based on channel multiplexing information in the control data transmitted from the base station transmitter 100.

The FFT-processed signal output from the FFT scheme 159 is input to the pilot symbol extractor 163. The pilot symbol extractor 163 extracts pilot symbols from the FFT-processed signal output from the FFT scheme 159, and outputs the extracted pilot symbols to the channel estimator 165. The channel estimator 165 performs channel estimation on the extracted pilot symbols output from the pilot symbol extractor 163, and outputs the channel estimation result to the equalizer 161. The channel estimator 165 performs a channel estimation operation on each of the subcarriers. The mobile station receiver 150 generates CQI corresponding to the channel estimation result from the channel estimator 165, and transmits the generated CQI to the base station transmitter 100 through a CQI transmitter (not illustrated in FIG. 1).

The symbol demapper 173 demodulates the channel-demultiplexed signal output from the channel demultiplexer 169 using a corresponding demodulation scheme under the control of the resource assignment controller 171, and outputs the demodulated signal to the decoder 175. The decoder 175 decodes the demodulated signal output from the symbol demapper 173 using a corresponding decoding scheme under the control of the resource assignment controller 171, and outputs the decoded signal to the CRC remover 177. The resource assignment controller 171 detects modulation and coding schemes, i.e., MCS level, used in the base station transmitter 100, included in the control data transmitted from the base station transmitter 100, and controls the demodulation scheme of the symbol demapper 173 and the decoding scheme of the decoder 175 based on the detected MCS level. The demodulation scheme and the decoding scheme correspond to the modulation scheme and the coding scheme used in the base station transmitter 100. The CRC remover 177 removes CRC bits from the decoded signal output from the decoder 175, and outputs the CRC-removed signal as information data bits transmitted by the transmitter.

In order for a base station transmitter to dynamically assign resources as described above, i.e., in order to dynamically assign channels and assign MCS level and transmission power, a procedure for feeding back CQI from a mobile station receiver to the base station transmitter is required.

FIG. 2 is a diagram schematically illustrating a process of feeding back CQI in a conventional OFDM communication. More specifically, FIG. 2 is a diagram schematically illustrating positions at which pilot signals are transmitted, in a frequency domain of a conventional OFDM communication system.

Referring to FIG. 2, an OFDM symbol in the OFDM communication system includes a plurality of subcarriers. Data or a pilot signal is transmitted through each of the subcarriers constituting an OFDM symbol. The number of subcarriers constituting the OFDM symbol can be variably set according to situations of the OFDM communication system. As illustrated in FIG. 2, pilot signals are transmitted through subcarriers in predetermined positions among the subcarriers constituting the OFDM symbol. Black-colored subcarriers represent subcarriers through which pilot signals are transmitted. Herein, a subcarrier through which a pilot signal is transmitted will be referred to as a 'pilot subcarrier,' and a subcarrier through which data is transmitted will be referred to as a 'data subcarrier.'

A conventional OFDM communication system is a fixed radio communication system in which mobile stations are fixedly located in specific positions. In the OFDM communication system, or fixed radio communication system, mobile stations determine CQI for each of all subcarriers received from a base station, and feed back the determined CQIs to the base station. There are various types of information that can be used as the CQI, and it will be assumed herein that an SNR is used as the CQI.

Referring to FIG. 2, a transmitter transmits pilot signals through only pilot subcarriers in predetermined positions. A receiver previously knows positions of the pilot subcarriers transmitted by the transmitter, and also knows the pilot signals transmitted through the pilot subcarriers. Here, the pilot signal is a predetermined sequence, and the sequence, i.e., a pilot sequence is prescribed between the transmitter and the receiver. The receiver calculates a channel gain in the pilot subcarrier, after dividing a signal received through the pilot subcarrier by a pilot signal transmitted by the transmitter through the pilot subcarrier, and calculates estimated channel gains of subcarriers except the pilot subcarriers, i.e., data subcarriers, by interpolating the calculated channel gains in the respective pilot subcarriers. Further, the receiver calculates SNRs of the pilot subcarriers and the data subcarriers by dividing the estimated channel gains of the pilot subcarriers and the data subcarriers by noise energy. The calculated CQIs, for example, SNRs for all subcarriers are fed back to the transmitter, for example, a base station and the base station controls a modulation scheme and a coding scheme for corresponding subcarriers using the CQIs for the subcarriers, fed back from the receiver, for example, mobile station. Herein, because the conventional OFDM communication system is a fixed radio communication system, it is assumed that once subcarriers are assigned to the mobile station, a channel condition of the subcarriers assigned to the mobile station is constant.

A description will now be made of a resource assignment scheme in a case in which CQIs for subcarriers are fed back. Here, a resource assignment scheme described below corresponds to a resource assignment scheme of the resource assignment controller 115. Additionally, herein, an OFDM communication system, or a fixed radio communication system, having one base station and a plurality of mobile stations will be taken into consideration. Further, an OFDM symbol vector x received at a mobile station will be defined as $x=\{x_1,$ $x_2, \ldots, x_N$. N denotes the total number of subcarriers in the OFDM communication system, and respective parameters of the received OFDM symbol vector x can be expressed as shown in Equation (1).

$$x_n = g_n P_n s_n + n_n \quad (1)$$

In Equation (1), $g_n$ denotes a complex channel gain of an $n^{th}$ subcarrier, $P_n$ denotes transmission power assigned in a transmitter, for example, a base station, $s_n$ denotes a transmitted data symbol, and $n_n$ denotes a mean-0, variance-$N_0$ complex Gaussian noise.

An $n^{th}$ subcarrier $\gamma_n$ can be defined as shown in Equation (2).

$$\gamma_n \equiv \frac{|g_n|^2}{N_0} \quad (2)$$

The currently available general resource assignment scheme, i.e., a scheme for assigning channel, MCS level, and transmission power, has been proposed on the assumption that a mobile station feeds back CQI for each of all subcarriers used in the OFDM communication system. Herein, a set of CQIs for the subcarriers constituting the OFDM communication system will be referred to as total CQI.

The resource assignment scheme will now be described herein below. First, it will be assumed that a base station transmits data targeting K users, i.e., K mobile stations. It will also be assumed that the base station has received the total CQIs fed back from the K mobile stations. CQI for an $m^{th}$ subcarrier of a $k^{th}$ mobile station among the K mobile stations will be defined as $\gamma^{(k)}_m$.

The resource assignment scheme for the case where the total CQI is fed back from the mobile stations has a 2-step algorithm including a first step for channel assignment and a second step for MCS level and transmission power assignment. In addition, an index of a mobile station assigned an $m^{th}$ subcarrier will be defined as $k_m$, and transmission power assigned to the $m^{th}$ subcarrier will be defined as $P_m$. If a channel assignment function based on CQI $\{\gamma^{(k)}_m : k=1, 2, \ldots, K\}$ fed back from the mobile stations is defined as $k(\bullet)$ and a transmission power assignment algorithm is defined as $\lambda(\bullet)$, the 2-step algorithm for the resource assignment scheme can be expressed as shown in Equations (3) and (4).

$$\kappa_m = \kappa(\gamma_m^{(1)}, \gamma_m^{(2)}, \ldots, \gamma_m^{(K)}) \text{ for } m=0,1,\ldots,M-1 \quad (3)$$

$$P_m = \lambda(\gamma_1^{(k1)}, \gamma_2^{(k2)}, \ldots, \gamma_M^{(kK)}) \text{ for } m=0,1,\ldots,M-1 \quad (4)$$

Accordingly, an SNR profile and mean frequency efficiency based on the SNR profile are uniquely determined according to the 2-step algorithm for the resource assignment scheme.

When the 2-step algorithm for the resource assignment scheme is used, optimal channel and transmission power assignment algorithms for a corresponding mobile station can be expressed as shown in Equation (5) and Equation (6).

$$\kappa_m = \underset{1 \leq k \leq K}{\arg\max} \, \gamma_m^{(k)} \quad (5)$$

In Equation (5), $k_m$ denotes an index of a mobile station having the maximum channel quality $\gamma^{(k)}_m$ in the case where an $m^{th}$ subcarrier is assigned. Therefore, in the optimal channel assignment algorithm of Equation (5), an optimal channel is assigned to a mobile station having the best channel quality in a corresponding subcarrier.

$$\{P_m, m=0, 1, \ldots, M-1\} = \underset{p_0, p_1, \ldots, p_{M-1}}{\arg\max} \sum_{m=0}^{M-1} \log_2(1 + p_m \gamma_m^{(k_m)}) \quad (6)$$

If channel assignment is completed in accordance with Equation (5), i.e., if a corresponding subcarrier is assigned to a mobile station having the best channel quality in the corresponding subcarrier, then MCS level and transmission power are assigned. Using a Lagrange equation, an optimal power assignment algorithm can be expressed as shown in Equation (7).

$$P_m = \begin{cases} 1/\gamma_0 - 1/\gamma_m^{(k_m)} & \text{for } \gamma_m^{(k_m)} \geq \gamma_0 \\ 0 & \text{for } \gamma_m^{(k_m)} < \gamma_0 \end{cases} \quad (7)$$

In Equation (7), $\gamma_0$ satisfies a condition of Equation (8).

$$\sum_{m=0}^{M-1} P_m = MP \quad (8)$$

In Equation (8), MP denotes a total transmission power available in the OFDM communication system. The transmission power assignment algorithm based on Equation (7) and Equation (8) is generally called a water-pouring algorithm. The water-pouring algorithm is an optimal transmission power assignment algorithm in which a transmitter maximizes a data rate for available transmission power when the transmitter knows CQIs of independent channels in a communication system having a plurality of the parallel independent channels. The transmitter assigns transmission power for a corresponding channel, and then determines an MCS level to be applied to the corresponding channel based on the CQI. However, as shown in Equation (5) and Equation (6), optimal channel and transmission power assignment has optimal effects only when CQIs for all subcarriers of the OFDM communication system are fed back with one constant.

However, in the current 4G mobile communication system, it is considered that OFDM scheme is utilized to a mobile communication system. Therefore, it is not preferable to assume that channel conditions of once assigned subcarriers are constant. That is, if subcarriers are assigned to a mobile station, channel conditions continuously change. Therefore, the mobile station must feed back variable CQIs for the subcarriers in order to normally use the resource assignment scheme. However, disadvantageously, an operation of frequently feeding back CQIs for all subcarriers in order to use an OFDM scheme in a mobile communication system causes signaling overhead, and signaling for feeding back CQIs for the subcarriers acts as uplink interference. Accordingly, there is a demand for a scheme for efficiently assigning resources, while minimizing signaling overhead caused by the feedback of CQIs in the OFDM mobile communication system.

SUMMARY OF THE INVENTION

It is, therefore, an object of the present invention to provide an apparatus and method for dynamically assigning resources according to channel conditions in an OFDM mobile communication system.

It is another object of the present invention to provide a dynamic resource assignment apparatus and method for minimizing signaling overhead caused by CQI feedback in an OFDM mobile communication system.

In accordance with a first aspect remove the "n" entirely of the present invention, there is provided a method for dynamically assigning resources in a transmitter of an Orthogonal Frequency Division Multiplexing (OFDM) mobile communication system that divides an entire frequency band into a plurality of subcarriers, transmits reference signals through a predetermined number of subcarriers among the plurality of the subcarriers, transmits data signals through subcarriers not including the subcarriers through which the reference signals are transmitted, and includes a plurality of subchannels each of which is a set of at least one among the plurality of subcarriers. The method includes the steps of receiving channel quality information (CQIs) for the subcarriers through which the reference signals are transmitted and the subcarriers through which the data signals are transmitted, in subbands, each including a predetermined number of subcarriers among a plurality of the subcarriers, the CQIs being received back from respective receivers; and dynamically assigning resources to the respective receivers according to the received CQIs.

In accordance with a second aspect of the present invention, there is provided a method for dynamically assigning resources in a transmitter of an Orthogonal Frequency Division Multiplexing (OFDM) mobile communication system that divides an entire frequency band into a plurality of subcarriers, transmits reference signals through a predetermined number of subcarriers among the plurality of the subcarriers, transmits data signals through subcarriers not including the subcarriers through which the reference signals are transmitted, and includes a plurality of subchannels each of which is a set of at least one among the plurality of subcarriers. The method includes the steps of receiving channel quality information (CQI) having a first parameter for which a mean channel gain of subcarriers in subbands, each of which includes a predetermined number of subcarriers among a plurality of the subcarriers and noise power are taken into consideration, and a second parameter for which a variance of subcarriers in the subbands and the noise power are taken into consideration, the CQIs being received from respective receivers; and dynamically assigning subchannels, modulation and coding schemes, and transmission power to the respective receivers based on the first parameter and the second parameter.

In accordance with a third aspect of the present invention, there is provided a method for transmitting channel quality information (CQI) in a receiver of an Orthogonal Frequency Division Multiplexing (OFDM) mobile communication system that divides an entire frequency band into a plurality of subcarriers, transmits reference signals through a predetermined number of subcarriers among the plurality of the subcarriers, transmits data signals through subcarriers not including the subcarriers through which the reference signals are transmitted, and includes a plurality of subchannels each of which is a set of at least one among the plurality of subcarriers. The method includes the steps of dividing a received signal into reference signals and data signals, classifying the reference signals and the data signals according to subbands, each of which includes a predetermined number of subcarriers among the plurality of the subcarriers; determining CQIs for the respective subbands; and transmitting the determined CQIs of the respective subbands to a transmitter.

In accordance with a fourth aspect of the present invention, there is provided an apparatus for dynamically assigning resources in a transmitter of an Orthogonal Frequency Division Multiplexing (OFDM) mobile communication system that divides an entire frequency band into a plurality of subcarriers, transmits reference signals through a predetermined number of subcarriers among the plurality of subcarriers, transmits data signals through subcarriers not including the subcarriers through which the reference signals are transmitted, and includes a plurality of subchannels, each of which is a set of at least one among the plurality of the subcarriers. The apparatus includes a resource assignment controller for receiving channel quality information (CQIs) for the subcarriers through which the reference signals are transmitted and the subcarriers through which the data signals are transmitted, in subbands, each including a predetermined number of subcarriers among a plurality of the subcarriers, the CQIs being received from respective receivers, and dynamically assigning resources to the respective receivers according to the received CQIs.

In accordance with a fifth aspect of the present invention, there is provided an apparatus for dynamically assigning resources a transmitter of in an Orthogonal Frequency Division Multiplexing (OFDM) mobile communication system that divides an entire frequency band into a plurality of subcarriers, transmits reference signals through a predetermined number of subcarriers among the plurality of subcarriers, transmits data signals through subcarriers not including the subcarriers through which the reference signals are transmitted, and includes a plurality of subchannels, each of which is a set of at least one among the plurality of the subcarriers. The apparatus includes a resource assignment controller for receiving channel quality information (CQIs) including a first parameter for which a mean channel gain of subcarriers in subbands, each of which includes a predetermined number of subcarriers among the plurality of subcarriers, and noise power are taken into consideration, and a second parameter for which a variance of subcarriers in the subbands and the noise power are taken into consideration, the CQIs being received from respective receivers, and dynamically assigning subchannels, modulation and coding schemes, and transmission power to the respective receivers considering the first parameter and the second parameter.

In accordance with a sixth aspect of the present invention, there is provided an apparatus for transmitting channel quality information (CQI) in a receiver of an Orthogonal Frequency Division Multiplexing (OFDM) mobile communication system that divides an entire frequency band into a plurality of subcarriers, transmits reference signals through a predetermined number of subcarriers among the plurality of subcarriers, transmits data signals through subcarriers not including the subcarriers through which the reference signals are transmitted, and includes a plurality of subchannels each of which is a set of at least one among the plurality of the subcarriers. The apparatus includes a channel estimator for dividing a received signal into at least one reference signal and at least one data signal, classifying the at least one reference signal and the at least one data signal according to subbands, each of which includes a predetermined number of subcarriers among the plurality of subcarriers, and determining CQIs for the respective subbands; and a transmitter for transmitting the determined CQIs of the respective subbands to a transmitter.

BRIEF DESCRIPTION OF THE DRAWINGS

The above and other objects, features, and advantages of the present invention will become more apparent from the following detailed description when taken in conjunction with the accompanying drawings in which.

DETAILED DESCRIPTION OF THE PREFERRED EMBODIMENT

Preferred embodiments of the present invention will now be described in detail herein below with reference to the annexed drawings. In the following description, a detailed description of known functions and configurations incorporated herein has been omitted for conciseness.

The present application proposes an efficient resource assignment scheme, i.e., channel, Modulation and Coding Scheme (MCS) level, and transmission power assignment scheme, in a mobile communication system utilizing an Orthogonal Frequency Division Multiplexing (OFDM) scheme (OFDM mobile communication system). In particular, the present invention proposes an efficient resource assignment scheme for minimizing a signaling load for Channel Quality Information (CQI) feedback by dividing an entire frequency band used in the OFDM mobile communication system into a plurality of subbands and feeding back individual CQIs for each of the subbands.

Figure 3:
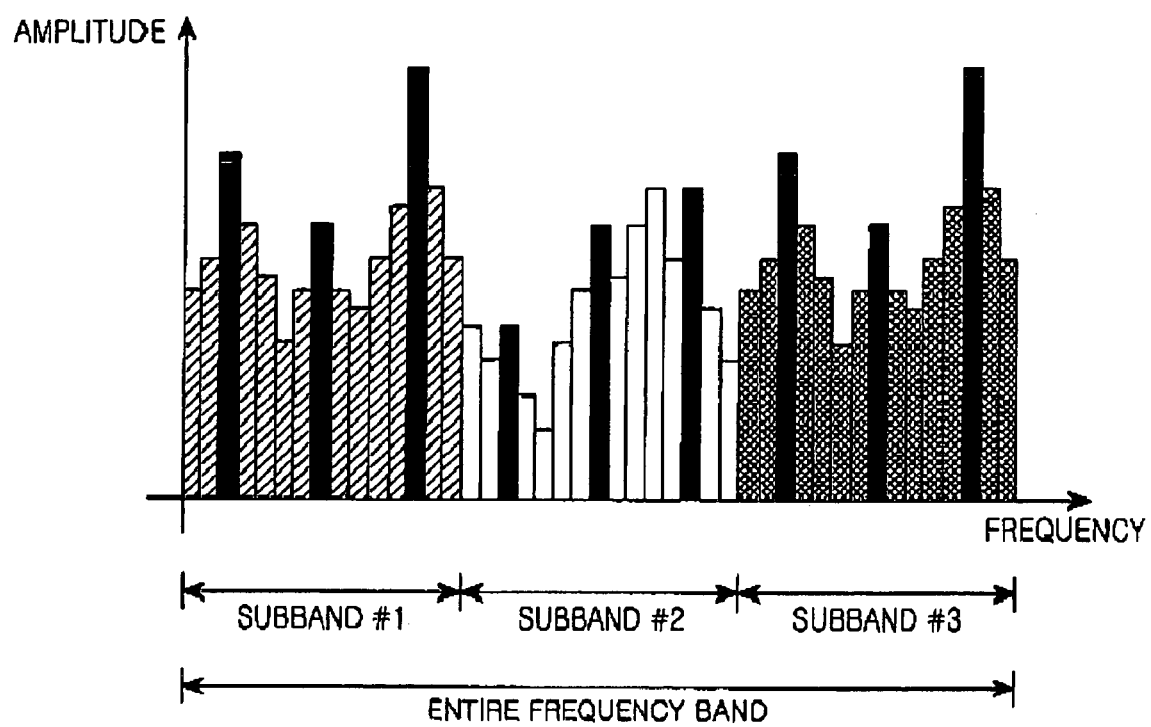
FIG. 3 is a diagram schematically illustrating positions at which pilot signals are transmitted, in a frequency domain of an OFDM mobile communication system according to an embodiment of the present invention.

FIG. 3 is a diagram schematically illustrating positions at which pilot signals are transmitted, in a frequency domain of an OFDM mobile communication system according to an embodiment of the present invention. As illustrated in FIG. 3, an entire frequency band of the OFDM communication system is divided into a plurality of subbands. Each of the subbands includes a plurality of subcarriers, and a data or pilot signal is transmitted through each of the subcarriers included in each subband. The number of subcarriers constituting the entire frequency band of the OFDM mobile communication system can be variably set according to the system situation. For convenience, it is assumed in FIG. 3 that 45 subcarriers make up the entire frequency band and a frequency domain occupied by 15 subcarriers includes one subband. Therefore, FIG. 3 illustrates 3 subbands (subband #1, subband #2, and subband #3), each of which includes 15 subcarriers.

Among the subcarriers included in the subbands illustrated in FIG. 3, subcarriers in predetermined positions are used to transmit pilot signals. In FIG. 3, black-colored subcarriers represent subcarriers through which pilot signals are transmitted. As described above, a subcarrier through which a pilot signal is transmitted will be referred to as a pilot subcarrier, and a subcarrier through which data is transmitted will be referred to as a data subcarrier. In FIG. 3, it will be assumed that there are 3 pilot subcarriers in each subband. As described in the Related Art section, the OFDM mobile communication system, unlike the existing fixed radio communication system utilizing OFDM, has variable channel conditions according to its characteristics. Therefore, in the OFDM mobile communication system, CQIs representing channel conditions should be frequently fed back in order to perform efficient communication considering a change in the channel conditions. There are various types of information that can be used as the CQI, and it will be assumed herein that a Signal-to-Noise Ratio (SNR) is used as the CQI. Referring to FIG. 3, a description will now be made of a process of feeding back CQIs for subcarriers to a base station (BS).

As illustrated in FIG. 3, pilot signals are transmitted through only the subcarriers in predetermined positions in a subband. It should be noted in FIG. 3 that a CQI feedback process only for the first subband will be described for simplicity, because the CQI feedback processes for other subbands are identical to that of the first subband.

A receiver, for example, a mobile station (MS), previously knows positions of the pilot subcarriers transmitted by a transmitter, for example a base station, and also knows the pilot signals transmitted through the pilot subcarriers. Here, the pilot signal is a predetermined sequence, and the sequence representing the pilot signal, i.e., a pilot sequence, is prescribed between the transmitter and the receiver. The receiver calculates a channel gain in the pilot subcarriers after dividing pilot signals received through the pilot subcarriers by pilot signals transmitted by the transmitter through the pilot subcarriers. Further, the receiver calculates estimated channel gains of subcarriers not including the pilot subcarriers, i.e., data subcarriers, in the first subband by interpolating the calculated channel gains in the respective pilot subcarriers. In addition, the receiver calculates SNRs of the pilot subcarriers and the data subcarriers by dividing the estimated channel gains of the subcarriers by noise energy.

After detecting SNRs for the pilot subcarriers and the data subcarriers in the first subband in this manner, the receiver calculates a mean of the detected SNRs for the pilot subcarriers and the data subcarriers.

Referring to FIG. 3, the subcarriers in the first subband have random amplitudes due to frequency selective fading. When only a mean SNR for the first subband is used, a variation in amplitude due to the frequency selective fading cannot be considered at all. Therefore, the present invention considers not only a mean SNR for the first subband but also a variation in amplitudes of the subcarriers, and provides the amplitude variation as a normalized variance.

Figure 1:
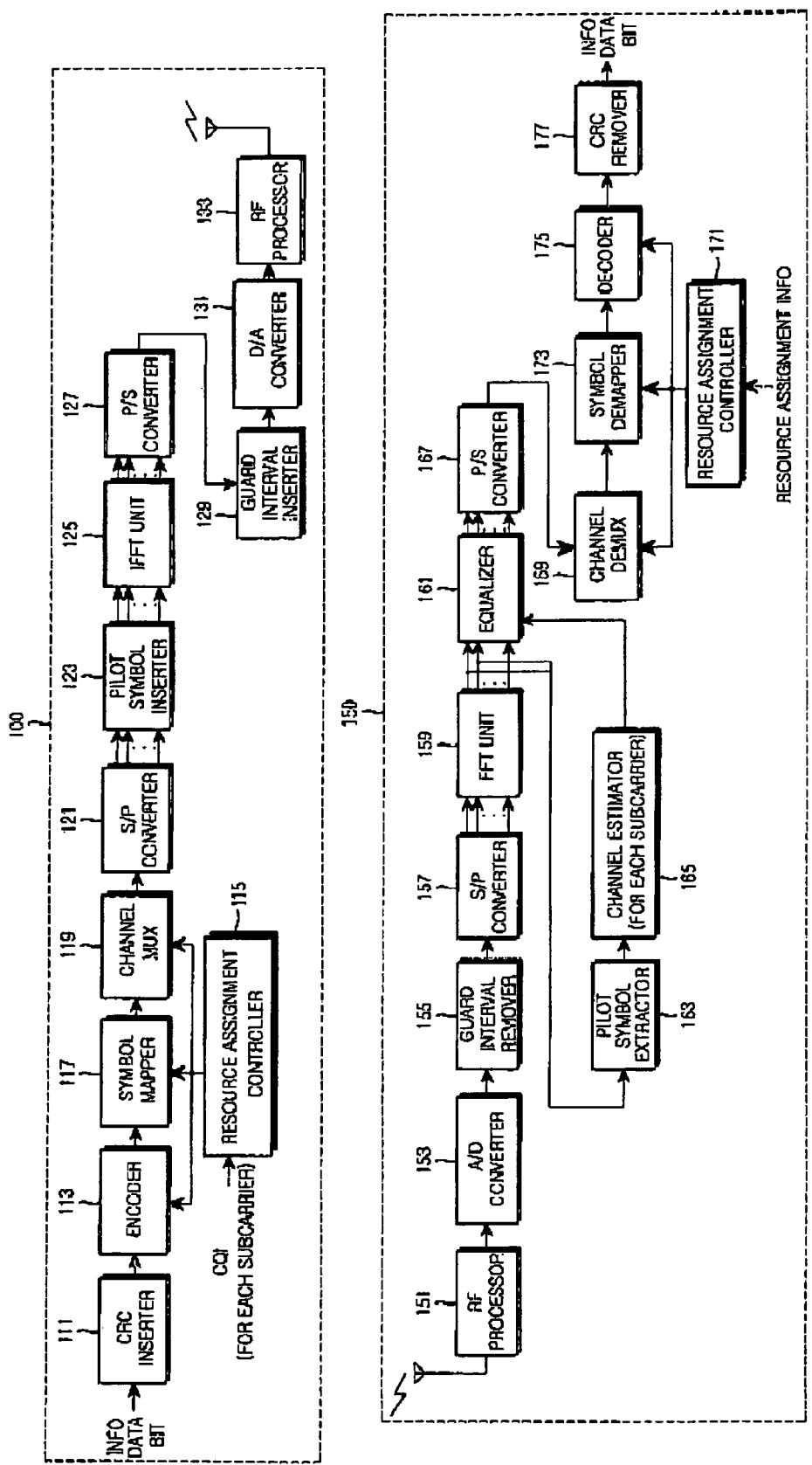
FIG. 1 is a block diagram schematically illustrating a conventional OFDM communication system.
Figure 2:
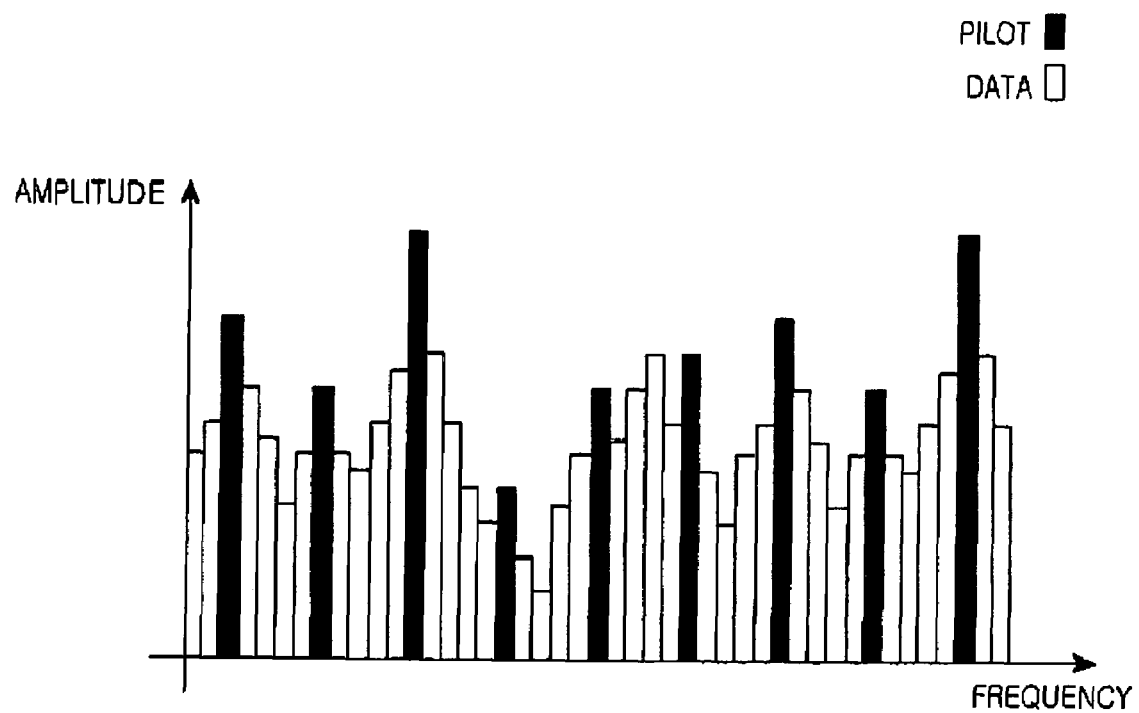
FIG. 2 is a diagram schematically illustrating positions at which pilot signals are transmitted, in a frequency domain of a conventional OFDM communication system.

As described with reference to FIG. 2 in the Related Art section, the term subchannel refers to a channel including at least one subcarrier. In the following description, it will be assumed that each of subchannels used in the OFDM mobile communication system includes the same number of subcarriers, for the convenience of explanation. Further, in the following description, the term "subchannel" and the term "channel" have the same meaning. Because a plurality of subcarriers constitute one subchannel, the subcarriers constituting one subchannel may be different from each other in SNR, because the subchannel experiences multipath fading, and SNR distribution of the subcarriers constituting one subchannel can be approximated to Rice distribution.

First, it will be assumed that a base station transmitter of the OFDM mobile communication system transmits data targeting K users, i.e., K mobile stations. Further, it will be assumed that the total number of subchannels used in the OFDM mobile communication system is M, the number of subcarriers constituting each of the M subchannels is L, and $g^{(k)}_m$ denotes a vector having a profile of a complex channel gain of an $m^{th}$ subchannel for a $k^{th}$ user, or a $k^{th}$ mobile station.

The complex channel gain $g^{(k)}_m$ of an $m^{th}$ subchannel for a $k^{th}$ mobile station can be expressed as shown in Equation (9).

$$g^{(k)}_m \cong [g^{(k)}_{m,0}, g^{(k)}_{m,1}, \ldots, g^{(k)}_{m,L-1}] \text{ for } m = 0, 1, \ldots, M-1 \quad (9)$$

In Equation (9), $$g^{(k)}_{m,l} = g^{(k)}_{mL+l}$$

where a subscript (m,l) denotes an index indicating an $l^{th}$ subcarrier of an $m^{th}$ subchannel and a subscript (mL+1) denotes a value determined by converting the subcarrier into an absolute carrier index. That is, because each subchannel includes L subcarriers, an absolute index of an $l^{th}$ subcarrier in an $m^{th}$ subchannel becomes mL+1. Further, in Equation (9), M denotes the total number of subchannels used in the OFDM mobile communication system, M=N/L, and N denotes a total number of subcarriers used in the OFDM mobile communication system.

A channel quality vector of an $m^{th}$ subchannel for the $k^{th}$ user can be expressed as shown in Equation (10).

$$\gamma^{(k)}_m = [\gamma^{(k)}_{m,1}, \gamma^{(k)}_{m,2}, \ldots, \gamma^{(k)}_{m,L}] \text{ with } \gamma^{(k)}_{m,l} \equiv |g^{(k)}_{m,l}|^2/N_0 \quad (10)$$

In Equation (10), $r^{(k)}_m$ denotes a channel quality vector of an $m^{th}$ subchannel for a $k^{th}$ mobile station, $N_0$ denotes a noise, and $r^{(k)}_{m,l}$ denotes channel quality of an $l^{th}$ subcarrier in an $m^{th}$ subchannel for a $k^{th}$ mobile station.

The channel quality is different from the SNR, and a relation between the channel quality and the SNR is defined as shown in Equation (11).

$$SNR: \beta^{(k)}_{m,L} = P_m E \gamma^{(k)}_{m,L} \quad (11)$$

In Equation (11), $\beta^{(k)}_{m,L}$ denotes an SNR of an $L^{th}$ subcarrier in an $m^{th}$ subchannel for a $k^{th}$ user, and $P_m$ denotes transmission power assigned to an $m^{th}$ subchannel.

In order to remove signaling overhead caused by CQI transmission, it is important to minimize a channel quality profile for subchannels. The channel quality distribution profile for the subchannels can also be approximated to Rice distribution. Therefore, the channel quality profile for the subchannels can be minimized to two parameters of Rice distribution.

Profiles for a mean and a variation of complex channel gains in a subchannel will be defined as shown in Equation (12).

$$G^{(k)}_m \equiv \frac{1}{L} \sum_{l=0}^{L-1} g^{(l)}_{m,l}$$

$$h^{(k)}_{m,l} \equiv g^{(k)}_{m,l} - G^{(l)} \quad (12)$$

In Equation (12), $G^{(k)}_m$ denotes a mean of complex channel gains of an $m^{th}$ subchannel for a $k^{th}$ mobile station, and $h^{(k)}_{m,l}$ denotes a variation in complex channel gains of an $m^{th}$ subchannel for a $k^{th}$ mobile station. When the profiles for a mean and a variation of complex channel gains in a subchannel are defined as Equation (12), probability distributions for a mean and a variation of complex channel gains in a subchannel become mean-0, variance-$\Omega(L)$ complex Gaussian distribution and mean-0, variance-'1-$\Omega(L)$' complex Gaussian distribution, respectively. The variance $\Omega(L)$, which is a real value, satisfies $\Omega(L) \leq 1$ and can be expressed as a function of a ratio of a coherence bandwidth of a channel to a bandwidth of a subchannel. Here, the coherence bandwidth refers to a maximum bandwidth where it can be assumed that a channel is static in a frequency domain.

When the channel quality profile for subchannels is approximated to Rice distribution, a square root of the channel quality for the subchannels can be expressed as Rice distribution of Equation (13).

$$\frac{|g^{(k)}_{m,l}|}{\sqrt{N_0}} \sim R_{A^{(k)}_m, B^{(k)}_m}(r) \equiv \frac{r}{B^{(k)}_m} I_0\left(\frac{\sqrt{A^{(k)}_m}\, r}{B^{(k)}_m}\right) \exp\left(-\frac{r^2 + A^{(k)}_m}{2B^{(k)}_m}\right), r \geq 0 \quad (13)$$

In Equation (13), $$I_0(z) = (2\pi)^{-1} \int_0^{2\pi} \exp(z \cos(u)) du,$$

and a Ricean parameter R is defined as $$R = \frac{A^{(k)}_m}{B^{(k)}_m}$$

for $A^{(k)}_m$ and $B^{(k)}_m$, both of which are a real number larger than 0. Here, $A^{(k)}_m = |G^{(k)}_m|^2/N_0$, $B^{(k)}_m = (1-\Omega(L))/2N_0$. $A^{(k)}_m$ becomes a value determined by dividing a square root of a mean of complex channel gains of an $m^{th}$ subchannel for a $k^{th}$ mobile station by a noise component, and $B^{(k)}_m$ becomes a value determined by a variance 1-$\Omega(L)$ by a noise component.

Further, in Equation (13), $G^{(k)}_m$ denotes a complex Gaussian random variable representing a mean of complex channel gains of an $m^{th}$ subchannel for a $k^{th}$ mobile station as described in connection with Equation (12). Therefore, $A^{(k)}_m$ becomes a random variable of exponent distribution, whereas $B^{(k)}_m$ has a fixed value for all values of m. As a result, mean channel quality and SNR of an $m^{th}$ subchannel are defined by $T^{(k)}_m = A^{(k)}_m + 2B^{(k)}_m$ and $P_m E T^{(k)}_m$, respectively.

A summary will now be made of assumptions applied in considering the channel quality profile for subchannels as Rice distribution.

(1) $G^{(k)}_0, G^{(k)}_1, \ldots, G^{(k)}_{M-1}$ represent mean-0, variance-$\Omega(L)$ i.i.d. (independent and identically distributed) complex Gaussian random variables.

(2) For all values of m, $h^{(k)}_{m,l}$, for l=1,2,3, ... L, represents a mean-0, variance-'1-$\Omega(L)$' complex Gaussian noise.

(3) In the entire frequency band, $g^{(k)}_{m,l}$ represents a mean-0, variance-1 complex Gaussian noise, but for given m, $g^{(k)}_{m,l}$ for l=1,2,3, ... L represents a mean-$G^{(k)}_m$, variance-'1-$\Omega(L)$' complex Gaussian noise.

Based on the foregoing assumptions, a channel quality profile for each subchannel is determined by the parameters $A^{(k)}_m$ and $B^{(k)}_m$ of Rice distribution function, and in a receiver, the parameters $A^{(k)}_m$ and $B^{(k)}_m$ of Rice distribution function are calculated as square mean and variance of a value determined by dividing $g^{(k)}_{m,l}$ by $\sqrt{N_0}$ for given m.

Using the Rice distribution model, frequency efficiency will be defined as a function of assigned transmission power P and parameters 'a' and 'b' of Rice distribution. This is expressed as shown in Equation (14).

$$U(P, a, b) \equiv \int_0^\infty \log_2(1 + P \cdot r^2) \cdot R_{a,b}(r) \cdot dr \quad (14)$$

In Equation (14), U(P,a,b) denotes frequency efficiency for which assigned transmission power P and channel quality of subchannels are considered, i.e., two parameters 'a' and 'b' on the subchannel quality profile, i.e., $A^{(k)}_m$ and $B^{(k)}_m$ in Equation (13), are considered, and $R_{a,b}(r)$ denotes Rice distribution defined in Equation (13). More specifically, 'r' denotes a variable value used in calculating Rice distribution, 'R' denotes Rice distribution, and 'dr' denotes differential operation for r. The parameters 'a' and 'b' of Rice distribution, illustrated in Equation (14), are identical to $A^{(k)}_m$ and $B^{(k)}_m$. The power assignment scheme will be described in more herein below.

A channel assignment scheme proposed in the present invention maximizes Rice distribution defined in Equation (13). This can be expressed as shown in Equation (15).

$$\kappa_m = \arg\max_k U(P, A_m^{(k)}, B_m^{(k)}) \quad (15)$$

In Equation (15), transmission power P is represented by a particular constant. This means that it is assigned to a mobile station whose frequency efficiency U is maximized when it is assumed that the same transmission power P is assigned when an $m^{th}$ subchannel is assigned to a specific mobile station. Therefore, in the calculation of Equation (15), the transmission power P can be randomly selected.

Referring again to Equation (15), for the assigned transmission power P, frequency efficiency $U(P,A^{(k)}_m,B^{(k)}_m)$ is calculated from CQIs fed back from K mobile stations, i.e., $A^{(k)}_m$ and $B^{(k)}_m$, and for all k, the calculated $U(P,A^{(k)}_m,B^{(k)}_m)$ values are compared. An $m^{th}$ subchannel is assigned to a mobile station having the maximum frequency efficiency $U(P,A^{(k)}_m,B^{(k)}_m)$ as a result of the comparison.

A power assignment scheme proposed in the present invention can be expressed in Equation (16).

$$\{P_m, m = 0, 1, \ldots, M-1\} = \quad (16)$$
$$\arg\max_{p_0, p_1, \ldots, p_{M-1}} \sum_{m=0}^{M-1} U(p_m, A_m^{(\kappa_m)}, B_m^{(\kappa_m)})$$

In Equation (16), $P_m$ must satisfy a condition of Equation (17).

$$\sum_{m=0}^{M-1} P_m = MP \quad (17)$$

In Equation (17), MP denotes total transmission power available in the OFDM mobile communication system. The transmission power $P_m$ assigned to an $m^{th}$ subchannel must be selected such that a sum of all frequency efficiencies should be maximized while satisfying a condition of Equation (17). Although not separately described, an MCS level is determined based on the CQI.

A detailed description will now be made of a process of calculating transmission power $P_m$ assigned to an $m^{th}$ subchannel in accordance with Equation (16). It will be assumed that subchannels are assigned in accordance with Equation (15) and the assigned subchannels are defined as $\{k_m; m=0, 1, \ldots, M-1\}$. Further, it will be assumed that an MCS level can be assigned within only a predetermined range in the OFDM mobile communication system and the number of bits representing a minimum MCS level among the available MCS levels within the predetermined range is β. Based on these assumptions, Equation (16) can be approximated according to a Greedy algorithm, as will be described with reference to FIG. 5.

Figure 5:
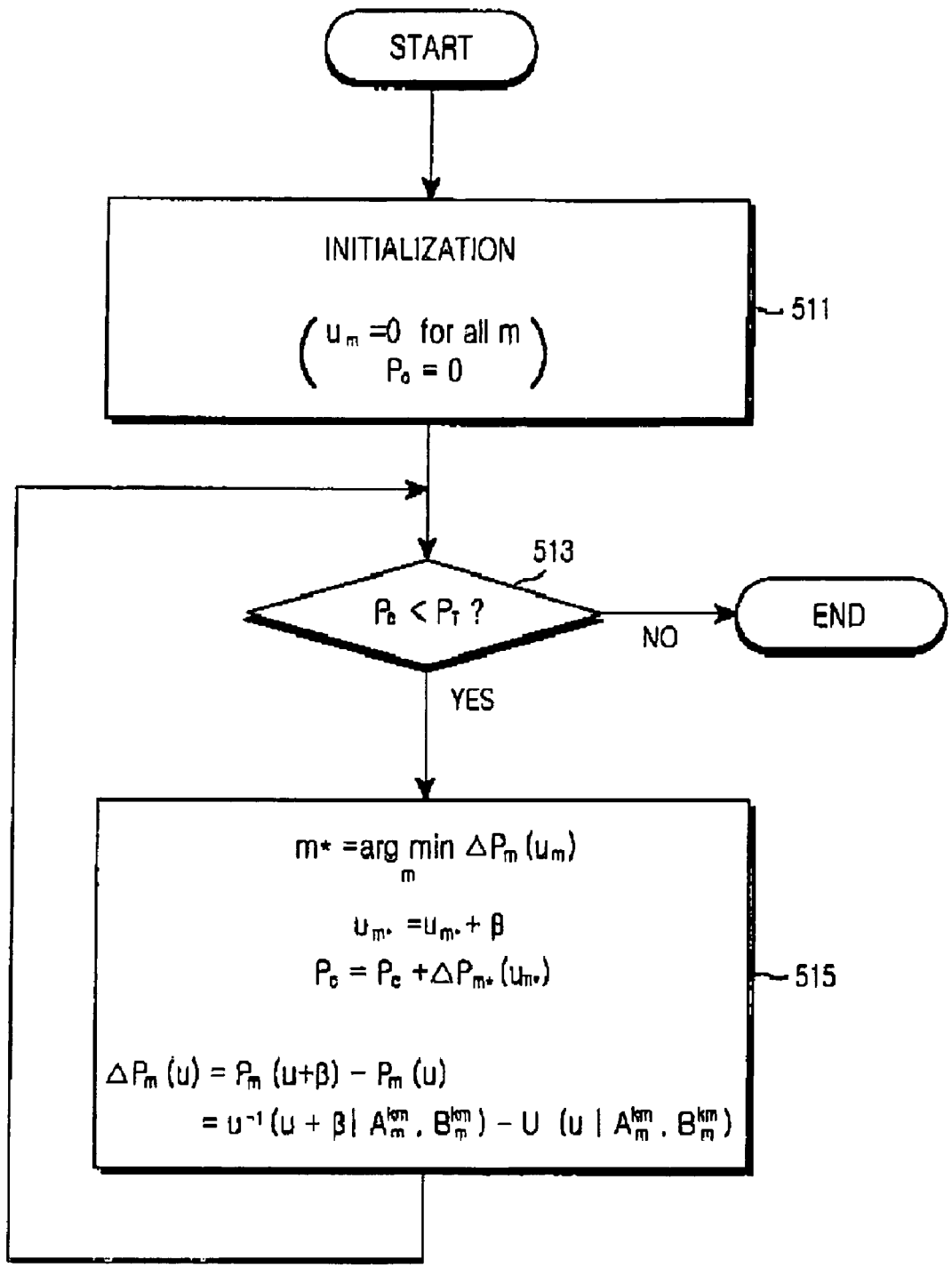
FIG. 5 is a flowchart illustrating a procedure for assigning transmission power according to an embodiment of the present invention.

FIG. 5 is a flowchart illustrating a procedure for assigning transmission power according to an embodiment of the present invention. Referring to FIG. 5, in step 511, a resource assignment controller initializes the number $U_m$ of initially assigned bits to 0 for all m, and also initializes the total assigned transmission power $P_c$ to 0, because there is no transmission power to be assigned. The resource assignment controller controls a channel, transmission power and MCS level assignment operation proposed in the present invention, and a detailed hardware structure thereof will later be described in detail with reference to FIG. 6.

In step 513, the resource assignment controller determines if the total assigned transmission power $P_c$ is lower than the total available transmission power $P_T$ of the OFDM mobile communication system. If it is determined that the total assigned transmission power $P_c$ is not lower than the total available transmission power $P_T$, i.e., the total assigned transmission power $P_c$ is higher than or equal to the total available transmission power $P_T$, the resource assignment controller ends the ongoing procedure because there is no more transmission power to assign.

If it is determined in step 513 that the total assigned transmission power $P_c$ is lower than the total available transmission power $P_T$, the resource assignment controller proceeds to step 515. In step 515, the resource assignment controller calculates transmission power $\Delta P_m(u_m)$ additionally needed to transmit as many bits as β representing an MCS level for all subchannels, and selects an index m* of a subchannel whose additional transmission power $\Delta P_m(u_m)$ is minimized. Thereafter, the resource assignment controller increases the number $u_m$* of accumulated bits of a subchannel corresponding to the selected index m* of the subchannel and the total assigned transmission power $P_c$ by β and $\Delta P_m*(u_m*+\beta)$, respectively, and then returns to step 513. As a result, transmission power $\Delta P_m(u)$ needed to transmit as many additional bits as β can be expressed as shown in Equation (18).

$$\Delta P_m(u) \equiv P_m(u + \beta) - P_m(u) \quad (18)$$
$$= U^{-1}(u + \beta | A_m^{\kappa_m}, B_m^{\kappa_m}) - U^{-1}(u | A_m^{\kappa_m}, B_m^{\kappa_m})$$

In Equation (18), $U^{-1}$ denotes an inverse function of the U function defined in Equation (14), and because the U function is a monotone increasing function of assigned transmission power P for $A^{(k\_m)}_m$ and $B^{(k\_m)}_m$ of Rice distribution, the $U^{-1}$ function is also uniquely determined by the assigned transmission power P.

Although the new channel assignment scheme based on Equation (16) and the new transmission power assignment scheme based on Equation (18) require calculation on a function U for the transmission power P and its inverse function when $A^{(k\_m)}{}_m$ and $B^{(k\_m)}{}_m$ of Rice distribution are previously given, it is difficult to calculate Equation (16) and Equation (18) including an inverse function of Equation (14) on a real-time basis in an actual signal transmitting/receiving process because of the integration calculation included in Equation (14). Therefore, an operation of providing a separate table to assign the channel and the transmission power and assigning channel and transmission power based on the contents of the table is easier than an operation of assigning channel and transmission power by calculating Equation (16) and Equation (18) on a real-time basis. For example, it is assumed that the CQIs of $A^{(k\_m)}{}_m$ and $B^{(k\_m)}{}_m$ are quantized within a predetermined range between, for example, 4 levels and 16 levels (for which 2 to 4 bits are needed), a frequency efficiency function U for the quantized ($A^{(k\_m)}{}_m$, $B^{(k\_m)}{}_m$) is stored in the table in association with the quantized transmission power P, and an inverse function of the frequency efficiency function U is stored in the table in association with the frequency efficiency function U.

Figure 4:
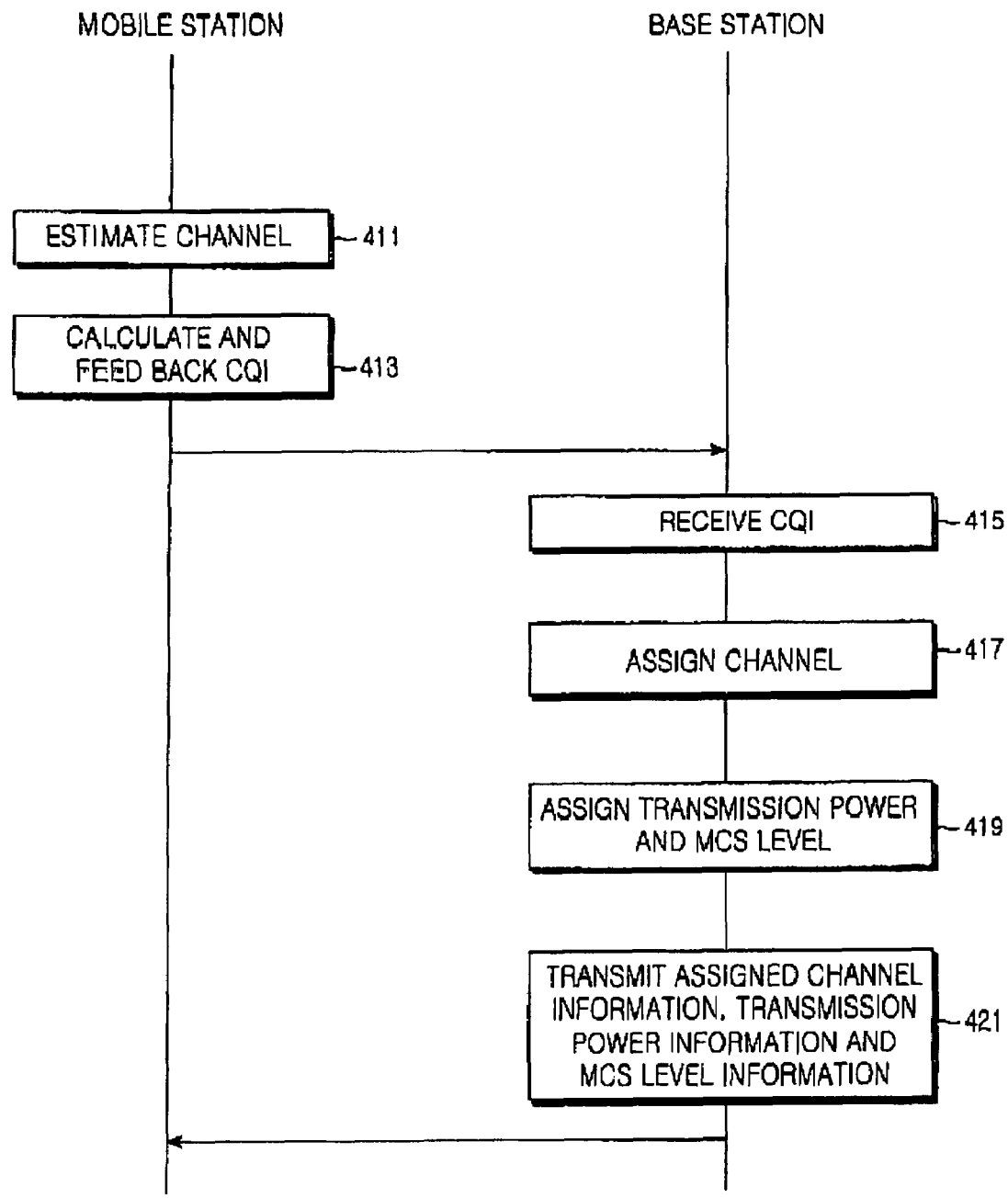
FIG. 4 is a signal flowchart schematically illustrating a resource assignment procedure according to an embodiment of the present invention.

FIG. 4 is a signal flowchart schematically illustrating a resource assignment procedure according to an embodiment of the present invention. Referring to FIG. 4, a mobile station estimates a channel using a pilot subcarrier signal received from a base station in Step 411. In the channel estimation process, as described in connection with FIG. 3, a receiver divides a signal received through a pilot subcarrier by a pilot signal transmitted through a pilot subcarrier by a transmitter, calculates a channel gain in the pilot subcarrier, and calculates channel gains in the respective subchannels by interpolating the calculated channel gains in the respective pilot subcarriers. After channel estimation, the mobile station divides the estimated channel gains of the subchannels by noise energy, approximates SNRs of the subchannels to Rice distribution, and calculates the CQI, i.e., two parameters $A^{(k)}{}_m$ and $B^{(k)}{}_m$ of Rice distribution.

The mobile station feeds back the parameters $A^{(k)}{}_m$ and $B^{(k)}{}_m$ separately calculated for the subchannels to the base station in Step 413. The mobile station quantizes the individual parameters $A^{(k)}{}_m$ and $B^{(k)}{}_m$ for the subchannels before feeding them back to the base station. Preferably, the quantized parameters are expressed as shown in Equations (19) and (20).

$$A_m^{(k)} = |G_m^{(k)}|^2 / \hat{N}_0, \text{ where } G_m^{(k)} \cong \frac{1}{L}\sum_{l=0}^{L-1} g_{m,l}^{(l)} \quad (19)$$

$$B_m^{(k)} = \frac{1}{L\hat{N}_0}\sum_{l=0_j}^{L-1} |\hat{g}_{m,l}^{(k)} - G_m^{(k)}|^2 \quad (20)$$

The base station receives the individual parameters $A^{(k)}{}_m$ and the $B^{(k)}{}_m$ for the subchannels, fed back from the mobile station in Step 415, and assigns subchannels according to the individual parameters $A^{(k)}{}_m$ and $B^{(k)}{}_m$ for the subchannels in Step 417. The subchannel assignment scheme has been already described above. Therefore, a detailed description thereof will not be presented again.

After the subchannel assignment, the base station assigns transmission power such that the assigned subchannel has the best frequency efficiency, and assigns an MCS level to be applied to the assigned subchannel in Step 419. The transmission power assignment scheme has already been described above. Therefore, a detailed description thereof will not be provided again.

After the assignment of transmission power and MCS level, the base station transmits the resource assignment information, i.e., subchannel assignment information, transmission power assignment information, and MCS level information, to the mobile station in Step 421. Thereafter, the mobile station communicates according to the resource assignment information received from the base station.

Figure 6:
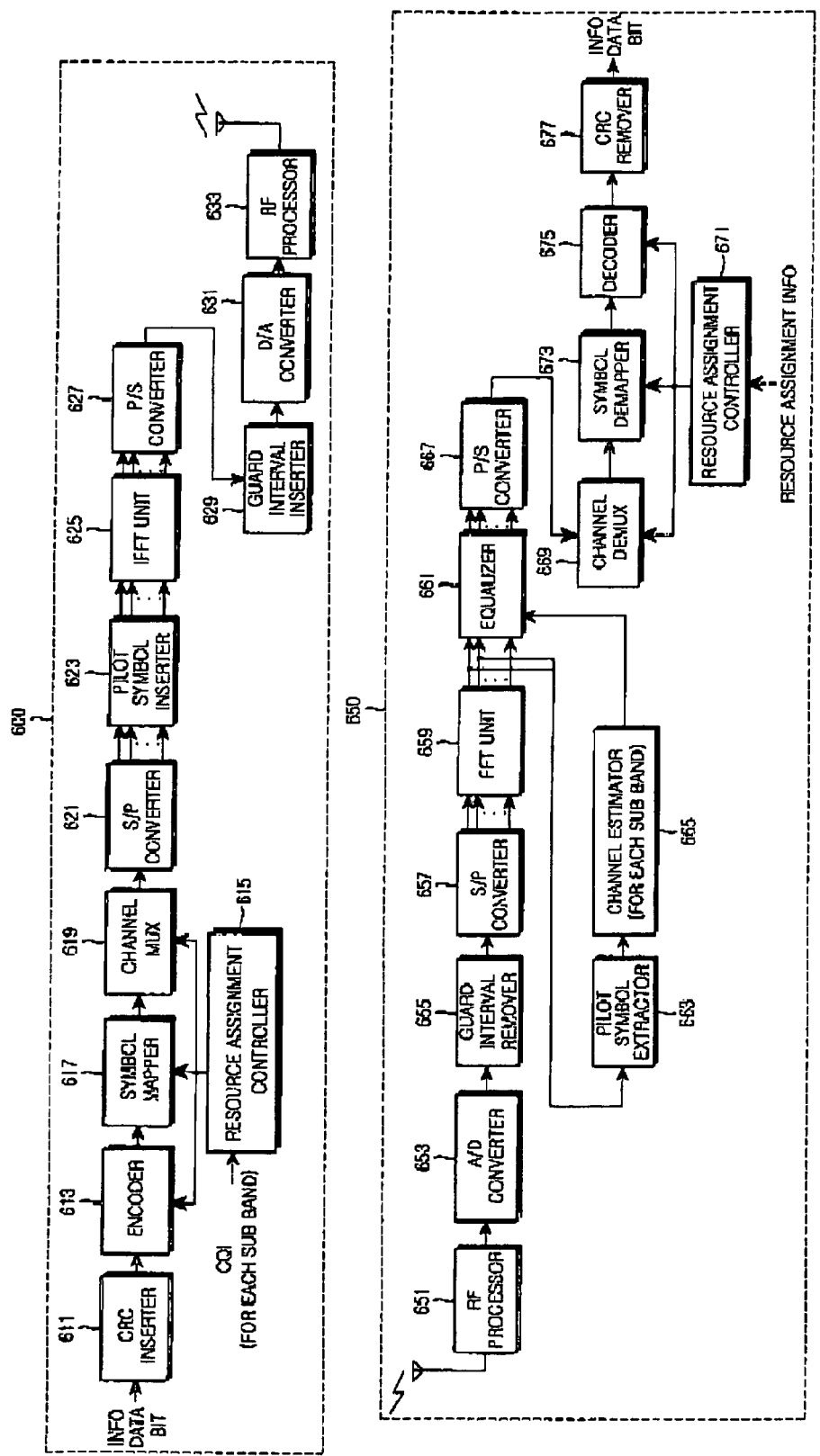
FIG. 6 is a block diagram schematically illustrating an OFDM mobile communication system according to an embodiment of the present invention.

FIG. 6 is a block diagram schematically illustrating an OFDM mobile communication system according to an embodiment of the present invention. Referring to FIG. 6, the OFDM mobile communication system includes a transmitter, for example, a base station transmitter 600, and a receiver, for example, a mobile station receiver 650.

The base station transmitter 600 includes a cyclic redundancy check (CRC) inserter 611, an encoder 613, a resource assignment controller 615, a symbol mapper 617, a channel multiplexer (MUX) 619, a serial-to-parallel (S/P) converter 621, a pilot symbol inserter 623, an inverse fast Fourier transform (EFFT) unit 625, a parallel-to-serial (P/S) converter 627, a guard interval inserter 629, a digital-to-analog (D/A) converter 631, and a radio frequency (RF) processor 633.

When there are user data bits and control data bits to transmit, the user data bits and the control data bits are input to the CRC inserter 611. As indicated above, the user data bits and the control data bits will be referred to as information data bits. The control data includes resource assignment information applied in the resource assignment controller 615, i.e., channel assignment information, transmission power assignment information, and MCS level information. The CRC inserter 611 inserts CRC bits in the information data bits, and outputs CRC-inserted information data bits to the encoder 613. The encoder 613 encodes the signal output from the CRC inserter 611 using a predetermined coding scheme under the control of the resource assignment controller 615, and outputs the encoded signal to the symbol mapper 617. Turbo coding scheme or convolutional coding scheme having a predetermined coding rate can be used as the coding scheme. The resource assignment controller 615 can control either or both of the coding rate and the coding scheme according to conditions of the OFDM communication system. The resource assignment controller 615 determines channel conditions between the base station and a mobile station based on CQI, or $A^{(k)}{}_m$ and $B^{(k)}{}_m$, fed back from a mobile station transmitter (not illustrated in FIG. 6).

The symbol mapper 617 modulates the coded bits output from the encoder 613 into modulation symbols using a corresponding modulation scheme under the control of the resource assignment controller 615, and outputs the modulation symbols to the channel multiplexer 619. For example, quadrature phase shift keying (QPSK) scheme or 16-ary quadrature amplitude modulation (16QAM) scheme can be used as the modulation scheme. The channel multiplexer 619 channel-multiplexes the modulation symbols output from the symbol mapper 617 under the control of the resource assignment controller 615, and outputs the channel-multiplexed symbols to the serial-to-parallel converter 621. Here, the resource assignment controller 615 controls the channel multiplexer 619 such that among the subchannels available in the OFDM communication system, an optimal subchannel is assigned to a corresponding mobile station using the $A^{(k)}{}_m$ and the $B^{(k)}{}_m$. That is, the channel multiplexer 619 dynamically multiplexes a channel according to channel conditions between the base station and the mobile station, thereby improving system performance.

If a channel condition between the base station and the mobile station is relatively excellent, the resource assignment controller 615 changes a current modulation scheme to a new modulation scheme having a higher order than an order of the current modulation scheme, and changes a current coding scheme to a new coding scheme having a higher coding rate than a coding rate of the current coding scheme. No matter how excellent the channel condition is, if the current modulation scheme has the highest possible order, the resource assignment controller 615 maintains the current modulation scheme, and if the current coding rate is the highest possible coding rate, the resource assignment controller 615 maintains the current coding rate.

However, if a channel condition between the base station and the mobile station is relatively poor, the resource assignment controller 615 changes a current modulation scheme to a new modulation scheme having a lower order than an order of the current modulation scheme, and changes a current coding scheme to a new coding scheme having a lower coding rate than a coding rate of the current coding scheme. No matter how poor the channel condition is, if the current modulation scheme has the lowest possible order, the resource assignment controller 615 maintains the current modulation scheme, and if the current coding rate is the lowest possible coding rate, the resource assignment controller 615 maintains the current coding rate.

In addition, the resource assignment controller 615 controls the channel multiplexer 619 such that among the channels available in the base station, a channel capable of providing the best channel condition, when it is assigned to a corresponding mobile station, should be assigned to the corresponding mobile station, thereby improving the entire system performance.

Although not illustrated in FIG. 6, the resource assignment controller 615 also controls transmission power to be applied to a channel assigned to the corresponding mobile station by the channel multiplexer 619. The serial-to-parallel converter 621 parallel-converts the channel-multiplexed serial modulation symbols output from the channel multiplexer 619, and outputs the parallel-converted modulation symbols to the pilot symbol inserter 623. The pilot symbol inserter 623 inserts pilot symbols into the parallel-converted modulation symbols output from the serial-to-parallel converter 621, and outputs the pilot-inserted modulation symbols to the IFFT unit 625.

The IFFT unit 625 performs N-point IFFT on the pilot-inserted modulation symbols output from the pilot symbol inserter 623, and outputs the IFFT-processed modulation symbols to the parallel-to-serial converter 627. The parallel-to-serial converter 627 serial-converts the IFFT-processed parallel modulation symbols output from the IFFT unit 625, and outputs the serial-converted modulation symbols to the guard interval inserter 629. The guard interval inserter 629 inserts a guard interval signal into the serial-converted modulation symbols output from the parallel-to-serial converter 627, and outputs the guard interval-inserted modulation symbols to the digital-to-analog converter 631. The guard interval is inserted to remove interference between a previous OFDM symbol transmitted at a previous OFDM symbol time and a current OFDM symbol to be transmitted at a current OFDM symbol time in the OFDM communication system. The guard interval is inserted in a cyclic prefix method or a cyclic prefix scheme. In the cyclic prefix scheme, a predetermined number of last samples of an OFDM symbol in a time domain are copied and inserted into a valid OFDM symbol, and in the cyclic postfix scheme, a predetermined number of first samples of an OFDM symbol in a time domain are copied and inserted into a valid OFDM symbol.

The digital-to-analog converter 631 analog-converts the signal output from the guard interval inserter 629, and outputs the analog-converted signal to the RF processor 633. The RF processor 633, including a filter and a front-end unit, RF-processes the signal output from the digital-to-analog converter 631, and transmits the RF-processed signal via a transmission antenna.

The mobile station receiver 650 includes an RF processor 651, an analog-to-digital (A/D) converter 653, a guard interval remover 655, a serial-to-parallel (S/P) converter 657, a fast Fourier transform (FFT) unit 659, an equalizer 661, a pilot symbol extractor 663, a channel estimator 665, a parallel-to-serial (P/S) converter 667, a channel demultiplexer (DEMUX) 669, a resource assignment controller 671, a symbol demapper 673, a decoder 675, and a CRC remover 677.

The signals transmitted by the base station transmitter 600 are received via a reception antenna of the mobile station receiver 650. The received signals experience a multipath channel and have a noise component. The signals received via the reception antenna are input to the RF processor 651, and the RF processor 651 down-converts the signals received via the reception antenna into an intermediate frequency (IF) signal, and outputs the IF signal to the analog-to-digital converter 653. The analog-to-digital converter 653 digital-converts an analog signal output from the RF processor 651, and outputs the digital-converted signal to the guard interval remover 655. The guard interval remover 655 removes a guard interval signal from the digital-converted signal output from the analog-to-digital converter 653, and outputs the guard interval-removed signal to the serial-to-parallel converter 657. The serial-to-parallel converter 657 parallel-converts the serial signal output from the guard interval remover 655, and outputs the parallel-converted signal to the FFT unit 659. The FFT unit 659 performs N-point FFT on the signal output from the serial-to-parallel converter 657, and outputs the FFT-processed signal to the equalizer 661 and the pilot symbol extractor 663.

The equalizer 661 channel-equalizes the signal output from the FFT unit 659, and outputs the channel-equalized signal to the parallel-to-serial converter 667. The parallel-to-serial converter 667 serial-converts the parallel signal output from the equalizer 661, and outputs the serial-converted signal to the channel demultiplexer 669. The channel demultiplexer 669 channel-demultiplexes the serial-converted signal output from the parallel-to-serial converter 667 under the control of the resource assignment controller 671, and outputs the channel-demultiplexed signal to the symbol demapper 673. The resource assignment controller 671 controls a channel demultiplexing operation of the channel demultiplexer 669 based on channel multiplexing information in the control data transmitted from the base station transmitter 600.

The FFT-processed signal output from the FFT unit 659 is input to the pilot symbol extractor 663. The pilot symbol extractor 663 extracts pilot symbols from the FFT-processed signal output from the FFT unit 659, and outputs the extracted pilot symbols to the channel estimator 665. The channel estimator 665 performs channel estimation on the extracted pilot symbols output from the pilot symbol extractor 663, and outputs the channel estimation result to the equalizer 661. The mobile station receiver 650 generates CQI corresponding to the channel estimation result from the channel estimator 665, and transmits the generated CQI to the base station transmitter 600 through a CQI transmitter (not illustrated in FIG. 6). Here, the CQI, as described above, is generated in the form of $A^{(k)}_m$ and $B^{(k)}_m$ for each subchannel.

The symbol demapper 673 demodulates the channel-demultiplexed signal output from the channel demultiplexer 669 using a corresponding demodulation scheme under the control of the resource assignment controller 671, and outputs the demodulated signal to the decoder 675. The decoder 675 decodes the demodulated signal output from the symbol demapper 673 using a corresponding decoding scheme under the control of the resource assignment controller 671, and outputs the decoded signal to the CRC remover 677.

The resource assignment controller 671 detects modulation and coding schemes, i.e., MCS level, used in the base station transmitter 600, included in the control data transmitted from the base station transmitter 600, and controls the demodulation scheme of the symbol demapper 673 and the decoding scheme of the decoder 675 based on the detected MCS level. The demodulation scheme and the decoding scheme correspond to the modulation scheme and the coding scheme used in the base station transmitter 600. The CRC remover 677 removes CRC bits from the decoded signal output from the decoder 675, and outputs the CRC-removed signal as information data bits transmitted by the transmitter.

As can be understood from the foregoing description, the OFDM mobile communication system transmits CQI in such a manner that a channel quality profile is minimized for each subband, thereby minimizing signaling overhead caused by CQI transmission. In addition, the OFDM mobile communication system can dynamically assign resources according to channel quality, using the CQI having the minimum channel quality profile.

While the present invention has been shown and described with reference to certain preferred embodiments thereof, it will be understood by those skilled in the art that various changes in form and details may be made therein without departing from the spirit and scope of the present invention as defined by the appended claims.

What is claimed is:

1. A method for dynamically assigning resources in a transmitter of an Orthogonal Frequency Division Multiplexing (OFDM) wireless communication system that divides an entire frequency band into a plurality of subcarriers, transmits reference signals through a predetermined number of the plurality of the subcarriers, transmits data signals through subcarriers, not including the subcarriers through which the reference signals are transmitted, and includes a plurality of subchannels, each of which is a set of at least one among the plurality of subcarriers, the method comprising the steps of:
   receiving channel quality informations (CQIs) including a first parameter related to a mean channel gain of subcarriers in subbands, each of which includes a predetermined number of subcarriers among a plurality of the subcarriers and noise power, and a second parameter related to a variance of subcarriers in the subbands and the noise power, the CQIs being received from respective receivers; and
   assigning the subchannels, modulation and coding schemes, and a transmission power to the respective receivers based on the first parameter and the second parameter.

2. The method of claim 1, further comprising the steps of:
   modulating and coding the data using the assigned modulation and coding schemes for the receivers, if there is data to be transmitted to the respective receivers;
   performing channel multiplexing, such that the modulated and coded data is transmittable through the assigned subchannels; and
   separately transmitting the reference signals to the respective receivers through predetermined subcarriers in the subchannels, such that the reference signals have the assigned transmission power.

3. The method of claim 1, wherein the first parameter and the second parameter are expressed respectively as $$A^{(k)}_m = |G^{(k)}_m|^2/N_0, B^{(k)}_m = (1-\Omega(L))/2N_0$$

where $A^{(k)}_m$ is the first parameter, $B^{(k)}_m$ is the second parameter, L denotes a number of subcarriers included in a subchannel, $G^{(k)}_m$ denotes a mean of a complex channel gain of an $m^{th}$ subchannel for a $k^{th}$ receiver, '1-$\Omega(L)$' denotes a variance, and $N_0$ denotes power noise.

4. The method of claim 2, wherein the step of assigning the subchannels based on the first parameter and the second parameter comprises the steps of:
   calculating frequency efficiencies to be occurred when a particular subchannel among the subchannels is assigned to the receivers, such that the particular subchannel has a same transmission power, considering first parameters and second parameters received from the respective receivers; and
   assigning a subchannel such that the particular subchannel is assigned to a receiver where a maximum frequency efficiency among the calculated frequency efficiencies is occurred.

5. The method of claim 4, wherein the frequency efficiency is calculated using $$U(P, a, b) \equiv \int_0^\infty \log_2(1 + P \cdot r^2) \cdot R_{a,b}(r) \cdot dr$$

where 'a' denotes $A^{(k)}_m$, 'b' denotes $B^{(k)}_m$, and P denotes the assigned transmission power.

6. The method of claim 4, wherein the step of assigning the transmission power based on the first parameter and the second parameter comprises the step of, after assigning subchannels where the maximum frequency efficiency is occurred to the receivers, assigning transmission power to the receivers such that a sum of frequency efficiencies possibly to be occurred when the subchannels are assigned to the receivers is maximized.

7. The method of claim 6, wherein the assigned transmission power is calculated using $$\{P_m, m = 0, 1, \ldots, M-1\} = \underset{p_0, p_1, \ldots, p_{M-1}}{\arg\max} \sum_{m=0}^{M-1} U(p_m, A^{(k_m)}_m, B^{(k_m)}_m)$$

where $P_m$ denotes transmission power assigned to an $m^{th}$ subchannel, and M denotes the number of the subchannels.

8. The method of claim 1, further comprising:
   dividing a received signal into at least one reference signal and at least one data signal;
   classifying the at least one reference signal and the at least one data signal according to subbands, each of which includes a predetermined number of the plurality of subcarriers, and determining CQI for each of the subbands; and
   transmitting the determined CQIs of the subbands to a transmitter.

9. An apparatus for dynamically assigning resources in a transmitter of an Orthogonal Frequency Division Multiplexing (OFDM) mobile communication system that divides an entire frequency band into a plurality of subcarriers, transmits reference signals through a predetermined number of the plurality of subcarriers, transmits data signals through subcarriers, not including the subcarriers through which the reference signals are transmitted, and includes a plurality of subchannels, each of which is a set of at least one among the plurality of the subcarriers, the apparatus comprising:

a resource assignment controller for receiving channel quality informations (CQIs) including a first parameter considering a mean channel gain of subcarriers in subbands, each of which includes a predetermined number of subcarriers among a plurality of the subcarriers, and noise power, and a second parameter considering a variance of subcarriers in the subbands and the noise power, the CQIs being received from respective receivers, and for dynamically assigning subchannels, modulation and coding schemes, and transmission power to the respective receivers based on the first parameter and the second parameter.

10. The apparatus of claim 9, further comprising:

an encoder for coding data using the assigned coding scheme for the respective receivers, upon receiving the data to be transmitted to the receivers;

a symbol mapper for modulating the coded data using the assigned modulation scheme for the respective receivers;

a channel multiplexer for performing channel multiplexing, such that the modulated data is transmittable through the assigned subchannels; and a transmitter for separately transmitting the reference signals to the receivers through predetermined subcarriers in the subbands, for a signal output from the channel multiplexer.

11. The apparatus of claim 9, wherein the first parameter and the second parameter are expressed respectively as $$A^{(k)}_m = |G^{(k)}_m|^2/N_0, \ B^{(k)}_m = (1-\Omega(L))/2N_0$$

where $A^{(k)}_m$ is the first parameter, $B^{(k)}_m$ is the second parameter, L denotes a number of subcarriers included in a subchannel, $G^{(k)}_m$ denotes a mean of a complex channel gain of an $m^{th}$ subchannel for a $k^{th}$ receiver, '1-$\Omega$(L)' denotes a variance, and $N_0$ denotes power noise.

12. The apparatus of claim 9, wherein the resource assignment controller calculates frequency efficiencies to be occurred when a particular subchannel among the subchannels is assigned to the receivers, such that the particular subchannel has a same transmission power, considering first parameters and second parameters received from the respective receivers, and assigns a subchannel such that the particular subchannel is assigned to a receiver where a maximum frequency efficiency among the calculated frequency efficiencies is occurred.

13. The apparatus of claim 12, wherein the frequency efficiency is calculated using $$U(P, a, b) \equiv \int_0^\infty \log_2(1 + P \cdot r^2) \cdot R_{a,b}(r) \cdot dr$$

where 'a' denotes $A^{(k)}_m$, 'b' denotes $B^{(k)}_m$, and P denotes the assigned transmission power.

14. The apparatus of claim 12, wherein the resource assignment controller, after assigning subchannels where the maximum frequency efficiency is occurred to the receivers, assigns transmission power to the receivers such that a sum of frequency efficiencies possibly occurring when the subchannels are assigned to the receivers is maximized.

15. The apparatus of claim 14, wherein the assigned transmission power is calculated using $$\{P_m, m = 0, 1, \ldots, M-1\} = \underset{p_0, p_1, \ldots, p_{M-1}}{\mathrm{argmax}} \sum_{m=0}^{M-1} U(p_m, A^{(k_m)}_m, B^{(k_m)}_m)$$

where $P_m$ denotes transmission power assigned to an $m^{th}$ subchannel, and M denotes the number of the subchannels.

16. The apparatus of claim 9 further comprising:

a channel estimator for dividing a received signal into at least one reference signal and at least one data signal, classifying the at least one reference signal and the at least one data signal according to subbands, each of which includes a predetermined number of the plurality of subcarriers, and determining CQIs for the respective subbands; and a transmitter for transmitting the determined CQIs of the respective subbands to a transmitter.

* * * * *